Patented June 26, 1934

1,963,965

UNITED STATES PATENT OFFICE 1,963,965

PRESERVATION OF FOODS

Harry R. Beard, Vancouver, British Columbia, Canada

No Drawing. Application April 11, 1929, Serial No. 354,445

12 Claims. (Cl. 99—14)

This invention relates to the preservation of foods, and particularly to a method of freezing or chilling foodstuffs, and is especially applicable to the freezing and chilling of fish, either whole, dressed, sliced or filleted, although it is also useful in connection with the treatment of other articles of food, such as meats, poultry, fruits and vegetables.

The nature and advantages of the invention will best be understood after a brief outline of some of the present methods of freezing and chilling and some of their attendant difficulties and disadvantages.

One of the methods employed is to place the articles to be chilled or frozen in a refrigerated room in which the air is slowly circulated and in some cases changed from time to time to carry off odors, vapors, etc., the articles being directly exposed to air. The temperature of the room is maintained either above or below the freezing point, according as to whether the articles are to be chilled or frozen. By this method freezing takes place very slowly, even with low room temperatures, for example, 0 degrees F. or lower, by virtue not only of the fact that air has a low rate of heat transfer but also because a more or less inert film of air surrounds each object. Such slow freezing is detrimental because it brings about undesirable changes in the foodstuffs (particularly fish), such as excessive discoloration and impairment of flavor. A further difficulty with this method is the excessive desiccation of watery objects being frozen, this difficulty being magnified when cut or sliced fish, or fillets of fish, are being treated, since the meat of such fish is directly exposed to the drying action of the air for a long period of time, the process being a slow one.

Another method at present in use involves the placing of the objects to be frozen in a metal container which is either in contact with, or fully immersed in, a refrigerated medium, such as cold brine. This method, besides the difficulty encountered in keeping the brine liquid out of the container, is subject to the difficulty of obtaining good contact of the objects (particularly whole fish or fowls, because of their odd shapes) with the container walls, it being evident that heat transfer must take place through said walls. In addition, such containers are expensive both in first cost and in handling.

A third method employed is that in which the articles are placed on metal shelves or trays which are in contact with a cooling liquid, heat transfer taking place partly through the trays and partly through refrigerated air which is maintained in the room. This method really embodies some features of each of the foregoing methods, and is subject to some of the disadvantages of each, in addition to which there is the disadvantage of rapid freezing of the articles where they contact with the trays and much slower freezing where they are in contact with the air. Furthermore, articles of different thickness will suffer in differing degrees from these local differences in rates of freezing.

Still another method commonly employed involves the freezing or chilling of the objects by direct contact with, or immersion in a current of refrigerated brine, usually a sodium chloride (NaCl) solution, or some other liquid having a freezing point lower than that of the objects being treated. While rapid freezing may be obtained with this method if solutions having very low freezing points are used, it has not been practical to use solutions other than sodium chloride solutions (with the addition, in some cases, of small quantities of other substances, such as glycerin) because of the fact that the articles to be frozen take up a certain amount of the solution, seriously affecting their flavor and quality. Practically, therefore, it has not been possible to utilize liquids having a freezing point much below that of a saturated solution of sodium chloride (—6.16 degrees F.), which is a disadvantage, for under certain conditions and with certain articles it is desirable to use much lower temperatures than that. In any event, whatever be the liquid employed, this method has the serious disadvantage of causing a penetration of the salt (or other elements) into the articles being treated, impairing their flavor and causing discoloration. It has also been found that, with fish which are after freezing to be glazed with ice for storage, this method of freezing prevents the application of a satisfactory ice glaze.

With these and other difficulties in view, the present invention has for its primary object the provision of a method of freezing or chilling foodstuffs which makes it possible: first, to freeze very rapidly by the use of very low temperatures, where desired; second, to freeze rapidly without the use of excessively low temperatures, where this is desirable; third, to freeze without salt penetration or any other undesirable change due to the freezing medium; and fourth, to freeze without substantial loss of water from the articles being treated.

The invention further contemplates a method which is continuous in operation, and which will obtain all the aforementioned results while at the same time being quicker, simpler, more efficient and more economical than freezing methods now in use.

More specifically, the invention contemplates the freezing or chilling of foodstuffs by exposing them, either directly, or in metallic containers, to a current of cold air moving at exceedingly high velocity, for example, at a velocity no less than 300 or 400 feet per minute and upwards, velocities of even 3,000 to 5,000 feet per minute being preferable with certain kinds of foods, for instance fish with a high content of water.

With such fish (some of which have a water content of as much as 80%), while it is desirable to effect the freezing rapidly, yet if, to accomplish this object, the freezing temperature be made too low, too much water will be frozen out of the tissues of the fish. On the other hand, if the fish is frozen too slowly, which is the usual result of using a higher freezing temperature, then the water in the fish freezes in large crystals, instead of minute crystals, which results in breaking the cells and tissues, whereupon, when the fish is defrosted, quantities of the juices in the fish are liberated and lost. In addition, the breaking down of the tissues has the effect of bruising the flesh, which hastens autolysis, i. e. self-digestion of the body by the enzymes in it. Treating by means of direct contact with circulating brine, (which heretofore has been the chief method of obtaining the desired rapid freezing) in addition to the difficulties already enumerated, also tends to increase the autolysis, since autolysis takes place more readily in the presence of salt.

By my invention, however, whether moderately low temperatures are to be employed or whether extremely low temperatures are to be used (as determined by the nature of the food products being frozen) the highly desirable rapid freezing may always be obtained, since I propose to maintain the movement of the air current at a high velocity, subject to any variations necessary, while the degree of refrigeration thereof may be very flexibly controlled.

The invention further contemplates the minimization of that difficulty which has heretofore been encountered in air freezing; namely the tendency of the air to carry off moisture from the objects being treated, especially from sliced fish and other watery objects, first, by reducing the time of exposure of the objects to the air, and second, by effecting a humidification of the air while it is being cooled.

How I carry out the process and what apparatus I may employ will now appear, as follows:

In connection with the usual freezing chamber or tunnel there is provided a means for creating a current of air therethrough of large volume and high velocity, as, for instance, a high speed blower. The blower and freezing tunnel are connected in series with an air cooler, which may conveniently be a group of refrigerated coils, through which the air may be passed and over which a calcium chloride brine is sprayed or flowed.

Alternatively, a spray of refrigerated brine may be employed in the circuit in place of the coils. The latter arrangement is particularly of value in the prevention of desiccation of the articles being treated, since the air, passing directly through the brine spray, absorbs moisture from the spray. To remove entrained brine, I propose to couple with a brine spray chamber a series of brine eliminator plates or any other available means for removing entrained brine from the refrigerated air to any extent desired. The circulation of the air is preferably a continuous one, from the blower, through the freezing chamber, to the cooler or spray-chamber, and thence through the brine-eliminator to the blower, fresh air being admitted, if desirable, to the system at periodic intervals or else continuously. After passing through the brine-eliminator the air may be further humidified, as by passing it over crushed ice, before delivering it to the high speed blower.

Still another modification which may be employed is to refrigerate the air by passing it over a group of cooling coils, while at the same time flowing a brine film over the coils to humidify the air as it is cooled, and to prevent the air from carrying moisture from the articles being treated to the coils on which it would otherwise condense.

In handling the fish, or other objects to be frozen, I may employ racks, hooks, cranes, trays, belt conveyors or small trucks, and I preferably pass the conveyors or containers into and out of the high-speed air tunnel or chamber through air-locks, to minimize refrigeration losses; and at this point I may mention that I have conceived a complete handling mechanism particularly adapted for use with the present method of freezing, which forms no part of this present invention but is embodied in a separate application. Said copending application is identified by Serial Number 426,206, filed February 6th, 1930, and contains reference to another copending application Serial No. 354,446, filed April 11th, 1929, in which I disclose and claim another freezing process embodying improvements in the minimizing of desiccation of articles during their freezing.

From the foregoing it will be obvious that the present method, whether used to preserve foods by freezing or by chilling, attains the desired high speed treatment, equally as readily with the moderately low temperatures which must be used with some articles as with the exceedingly low temperatures which may be used with other articles; that such high-speed freezing is attained (in either case, as aforesaid), without salt penetration of the foodstuffs, and with a minimization of the handling problems heretofore encountered; that autolysis, rust, formation of large ice-crystals with attendant rupture of tissues, discoloration and impairment of flavor are greatly minimized; and that desiccation of watery articles is greatly diminished.

What I claim is:—

1. In the preservation of foods, the process of freezing which includes the step of subjecting the articles to the action of a high speed current of a refrigerated gaseous medium at freezing temperatures and having a rate of flow amongst said articles of between approximately 400 and 3000 feet per minute.

2. In the preservation of foods, the process of freezing or chilling which includes the step of subjecting the articles to the action of a high speed current of a refrigerated gaseous medium having a rate of flow of at least 300 feet per minute.

3. In the preservation of foods, the process of chilling which includes the step of subjecting the articles to the action of a high speed current of a refrigerated gaseous medium having a rate of ow amongst said articles of between approximately 400 and 3000 feet per minute.

4. The method of treating articles of food which includes setting up a continuous current of refrigerated gaseous medium, passing the same at high speed through a given zone with a velocity of between 300 and 5000 feet per minute in said zone, and inserting the articles in said zone.

5. The method of treating articles of food which includes setting up a continuous current of refrigerated gaseous medium, passing the same at high speed through a given zone with a velocity of between 300 and 5000 feet per minute in said zone, and inserting the articles in said zone, directly exposed to said current.

6. The method of freezing or chilling foodstuffs which consists in refrigerating and simultaneously humidifying a gaseous medium, and in passing the same at a speed in the vicinity of 3000 ft. per minute among the articles being treated.

7. The method of freezing or chilling foodstuffs which consists in refrigerating and simultaneously humidifying a gaseous medium, and in passing the same at a velocity of between 300 and 5000 feet per minute among the articles being treated.

8. The method of freezing or chilling foodstuffs which consists in refrigerating a gaseous medium, in setting the same into a substantially continuous-circuit flow at a rate of between 300 and 5000 feet per minute in at least a given zone of said circuit, in subjecting the foodstuffs to the action of the circulating medium in said zone, and in regulating the speed of the current in said zone, within the said limits, in accordance with the characteristics of the articles being treated.

9. The method of freezing foodstuffs which consists in refrigerating a gaseous medium, in setting the same into a substantially continuous-circuit flow at a rate of between 300 and 5000 feet per minute in at least a given zone of said circuit, in subjecting the foodstuffs to the action of the circulating medium in said zone, and in regulating the speed of the current in said zone, within the said limits, in accordance with the freezing temperature employed.

10. The method of freezing or chilling foodstuffs which consists in refrigerating a gaseous medium, in treating it by causing relative movement between it and a brine solution, in setting up a current of the fully treated gaseous medium, and in subjecting the foodstuffs to the action of such medium at a relative speed between the articles and the medium of intermediate 300 and 3000 feet per minute.

11. The method of treating articles of food which includes setting up a continuous current of refrigerated gaseous medium, passing the same at high speed through a given zone with a velocity of between 300 and 5000 feet per minute in said zone, and inserting the articles in said zone in containers of a nature which will transfer heat sufficiently rapidly from said articles to said high speed gaseous medium as to obtain the physical and chemical advantages resulting from the said high-speed current.

12. The method of treating foodstuffs which consists in refrigerating a gaseous medium to a point below freezing; in setting the same into a substantially continuous-circuit flow; in maintaining the rate of flow in at least a predetermined zone of said circuit, for a given article to be treated, within a relatively narrow range, said range lying at an intermediate point between a minimum limit of 400 feet per minute and a maximum limit approximating 3000 feet per minute; in subjecting the foodstuffs to the refrigerating influence of said flowing medium in said zone; and in protecting the foodstuffs against excessive desiccation by said flowing medium.

HARRY R. BEARD.